Patented Nov. 4, 1941

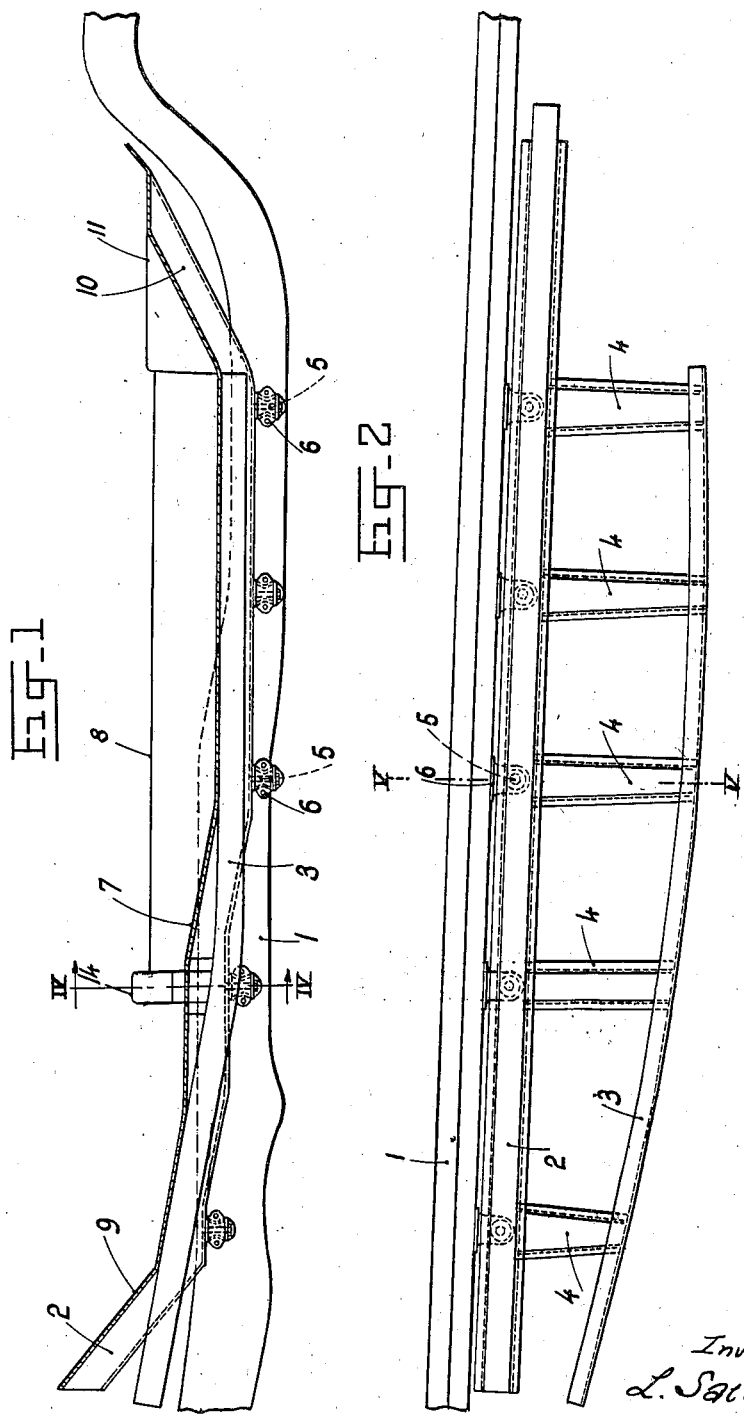

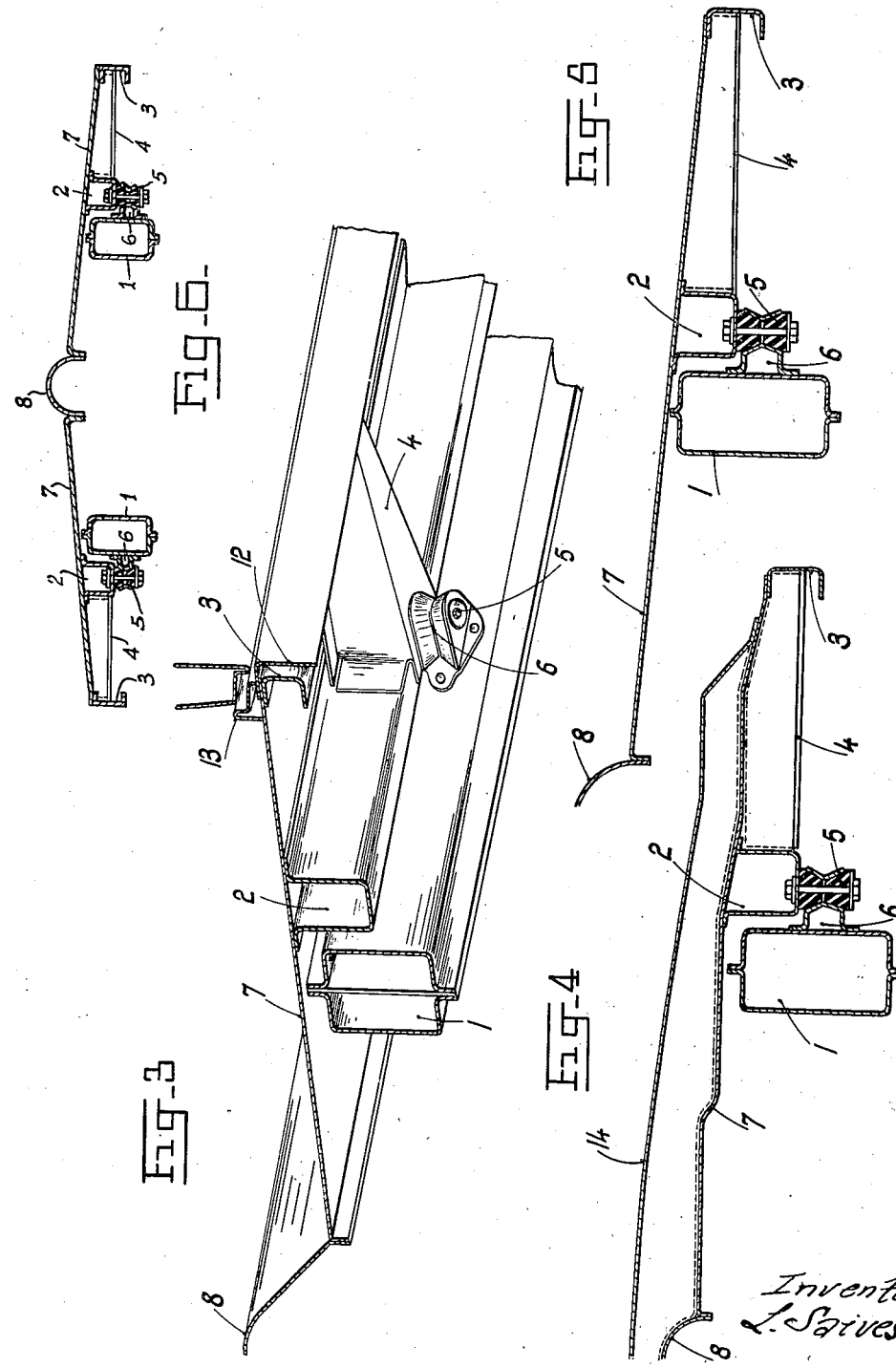

2,261,860

UNITED STATES PATENT OFFICE 2,261,860

BODY FOR VEHICLES

Léon Saives, Billancourt, France, assignor to Louis Renault, Billancourt, Seine, France Application February 3, 1939, Serial No. 254,477
In France February 10, 1938

2 Claims. (Cl. 296—35)

The present invention relates to improvements in bodies for vehicles and pertains chiefly to a new construction which facilitates the assembling of wide bodies, and dispenses with the use of brackets in order to support the outer edges, which project beyond the vehicle frame.

According to the subject-matter of the invention, there is mounted, at the outside of each side-beam of the vehicle frame and at a short distance from the latter, a secondary side-beam consisting of channel iron which is practically parallel to the main beam for a certain length. Longitudinal members consisting of channel iron, whose outline corresponds to that of the extreme edges of the vehicle body and which have practically the same length as the secondary beams, are connected with said beams by cross-pieces consisting of channel iron, thus affording a most rigid construction.

The structure consisting of the secondary side-beams and the longitudinal members of the vehicle body is secured to the side-beams of the vehicle frame by elastic connecting devices which are mounted adjacent the cross-pieces and are supported at the sides by the side-beams of the vehicle frame.

The secondary side-beams and the longitudinal members of the vehicle body carry the flooring, the edges of which are welded at one end to a hollow member which is arranged along the axis of the vehicle frame in order to provide for the movements of the transmission shaft, and at the other end to the upper flanges of the longitudinal members.

The flooring is also welded to the secondary side-beams.

Such a structure provides a wide body in which the flooring is entirely supported by the hollow member and by the structure which is formed beyond the vehicle frame by the secondary side-beams which are connected with the longitudinal members of the vehicle body by the cross-pieces and by the cross-piece located under the seat.

The invention is herein described with reference to the accompanying drawings.

Fig. 1 is an elevational view of the wide body showing the floor in section.

Fig. 2 is a half plan view corresponding to Fig. 1 with the floor removed.

Fig. 3 is a perspective view of the bottom part of the body.

Fig. 4 is a cross-section on the line IV—IV of Fig. 1.

Fig. 5 is a like section on the line V—V of Fig. 2.

Fig. 6 is a sectional view similar to Fig. 5 showing both sides of the frame.

These figures show the vehicle frame, which is constructed in the known manner by means of side-beams 1. Parallel to the beams 1, and at a short distance on the outside of the same, there are mounted the secondary side-beams 2 consisting of channel bars which have a certain length and are joined to the longitudinal members 3 of the vehicle body which also consist of channel bars and which have practically the same length as the secondary side-beams, by cross-pieces 4 which are suitably welded and by a transverse member 14 located under the seat and extending across the whole width of the vehicle body.

The structure formed by the secondary side-beams 2 and the longitudinal members of the vehicle body is connected with the vehicle frame by a system of elastic connections 5 which are located adjacent each cross-piece 4 and are mounted at the bottom of the respective secondary side-beams 2, and their supports 6 are secured to the side of the beams 1.

The flooring 7 is thus supported by the secondary beams 2 and the longitudinal members 3, to which it is welded, and it is joined by its inner edge to a hollow member 8 which is arranged along the axis of the vehicle frame and provides for the movements of the transmission shaft, while at the same time it is separated from the side-beams 1 of the vehicle frame.

The hollow member 8 is connected at the front part with the transverse member 14 and at the rear with a member 11 which forms a sort of central longitudinal rib adapted to aid in supporting the flooring at its middle part.

The secondary side-beams 2 are curved upwardly in front in order to support the inclined plane 9 which here serves as an extension for the flooring 7, and are also raised at 10 in order to conform to the outline of the side-beams 1 and to be connected with the rear member 11.

Each of the longitudinal members 3 is covered by an L-shaped section bar 12 which is welded by its horizontal flange to the flooring 7 and on which are suitably mounted the flange members 13.

The present construction thus provides a body structure which is considerably larger than the vehicle frame, but is not directly secured to the latter, as it is supported by the hollow member and also by the secondary side-beams and the longitudinal members of the vehicle body which have an elastic connection with the vehicle frame.

I claim:

1. In a vehicle the combination of, a frame having side beams, a secondary beam arranged outside each of said frame beams, a longitudinal body member arranged laterally of each frame beam and outside each secondary beam, an arched member arranged centrally of the frame beams, cross pieces connecting the secondary beams and the longitudinal body members, elastic members supporting each secondary beam on the respective frame beam, and a flooring secured to the longitudinal body members and the secondary beams and the arched member so as to be supported by the secondary beam and the body members and the arched members.

2. In a vehicle the combination of, a frame having side beams, a secondary beam arranged outside each of said frame beams, a longitudinal body member arranged laterally of each frame beam and outside each secondary beam, an arched member arranged centrally of said frame beams, cross pieces connecting the secondary beams and the longitudinal body members, elastic members supporting the secondary beams on the respective frame beam, a transverse member supporting the arched member on the secondary beams, and a flooring supported by the secondary beams and the longitudinal body member and the arched member.

LÉON SAIVES.